(12) United States Patent
Schmalzried

(10) Patent No.: US 11,193,804 B2
(45) Date of Patent: Dec. 7, 2021

(54) METHOD OF OPERATING A MAGNETO-INDUCTIVE FLOWMETER HAVING COMPREHENSIVE DISTURBANCE EFFECT COMPENSATION

(71) Applicant: Endress+Hauser Flowtec AG, Reinach (CH)

(72) Inventor: Frank Schmalzried, Zolling (DE)

(73) Assignee: Endress+Hauser Flowtec AG, Reinach (CH)

( * ) Notice: Subject to any disclaimer, the term of this patent is extended or adjusted under 35 U.S.C. 154(b) by 109 days.

(21) Appl. No.: 16/494,920

(22) PCT Filed: Feb. 28, 2018

(86) PCT No.: PCT/EP2018/054926
§ 371 (c)(1),
(2) Date: Sep. 17, 2019

(87) PCT Pub. No.: WO2018/172028
PCT Pub. Date: Sep. 27, 2018

(65) Prior Publication Data
US 2020/0271492 A1    Aug. 27, 2020

(30) Foreign Application Priority Data
Mar. 20, 2017   (DE) .................. 10 2017 105 959.8

(51) Int. Cl.
*G01F 1/60*   (2006.01)
*G01F 1/58*   (2006.01)

(52) U.S. Cl.
CPC ................ *G01F 1/60* (2013.01); *G01F 1/588* (2013.01)

(58) Field of Classification Search
None
See application file for complete search history.

(56) References Cited

U.S. PATENT DOCUMENTS

| | | | | |
|---|---|---|---|---|
| 4,704,908 A * | 11/1987 | Blatter | .............. | G01F 1/60 73/861.17 |
| 4,856,345 A * | 8/1989 | Mochizuki | .............. | G01F 1/60 73/861.17 |
| 4,953,409 A * | 9/1990 | Marchewka | .............. | G01F 1/60 73/861.17 |
| 5,351,554 A * | 10/1994 | Budmiger | .............. | G01F 1/60 73/861.16 |
| 6,237,424 B1 * | 5/2001 | Salmasi | .............. | G01F 1/002 73/861.11 |
| 9,304,021 B2 * | 4/2016 | Kung | .............. | G01F 1/60 |
| 2016/0097662 A1 | 4/2016 | Chang et al. | | |

(Continued)

FOREIGN PATENT DOCUMENTS

| | | |
|---|---|---|
| CN | 101849164 A | 9/2010 |
| CN | 102203569 A | 9/2011 |
| DE | 3132471 A1 | 4/1982 |

(Continued)

*Primary Examiner* — Harshad R Patel
(74) *Attorney, Agent, or Firm* — Kelly J. Smith; Endress+Hauser (USA) Holding Inc.

(57) ABSTRACT

The present disclosure relates to a method for operating a magnetoinductive flowmeter as well as to such a flowmeter, wherein a disturbance superimposed on a measurement signal is at least partially compensated for by negative feedback of the disturbance to the measurement signal.

17 Claims, 5 Drawing Sheets

(56) References Cited

U.S. PATENT DOCUMENTS

2019/0078915 A1* 3/2019 Mitsutake ................. G01F 1/60

FOREIGN PATENT DOCUMENTS

| DE | 3537752 A1 | 4/1987 |
| DE | 10118003 A1 | 10/2002 |
| DE | 69821474 T2 | 12/2004 |
| DE | 102012106926 A1 | 5/2014 |
| DE | 102012106926 A8 | 5/2014 |
| RU | 2401990 C2 | 10/2010 |

* cited by examiner

METHOD OF OPERATING A MAGNETO-INDUCTIVE FLOWMETER HAVING COMPREHENSIVE DISTURBANCE EFFECT COMPENSATION

CROSS-REFERENCE TO RELATED APPLICATIONS

The present application is related to and claims the priority benefit of German Patent Application No. 10 2017 105 959.8, filed on Mar. 20, 2017 and International Patent Application No. PCT/EP2018/054926 filed on Feb. 28, 2018, the entire contents of which are incorporated herein by reference.

TECHNICAL FIELD

The invention relates to a method for operating a magnetoinductive flowmeter for measuring flow velocity or volume flow of a medium in a measuring tube as well as to a magnetoinductive flowmeter.

BACKGROUND

Magnetoinductive flowmeters have been state of the art for a long time and are used for flow measurement of various media flowing through a measuring tube. The measuring principle is based on the separating of charge carriers of the medium moving in a magnetic field, whereby flow dependent electrical voltage arises, which can be registered by measuring electrodes and which enables determining the flow of the medium flowing medium through the measuring tube.

This flow dependent electrical voltage is, however, also influenced by electrochemical disturbance effects at the interfaces of the measuring electrodes with the medium, a fact which makes the flow measurement difficult, since the disturbance effects can bring about electrical voltages, which, in given cases, can have magnitudes a number of orders greater than the electrical voltage related to the flow. A flow measurement comprises, in such case, for most devices, a measurement of a difference of two electrode voltages, which were measured in the presence of different magnetic fields. In order to be able to measure these electrode voltages correctly, it is absolutely necessary that the electrode voltages remain within a working range of a circuit interpreting the electrode voltages. Without a correction of the disturbance effects, one is compelled to choose a very broad working range, this meaning, thus, the accuracy of the measurements of the electrical voltage is small and measurement errors of the flow measured values are large. In order to confront this problem, DE3537752A1 teaches an analog electronic circuit, which corrects the measurement electrode signals by a feedback. However, the teaching requires the use of compensation intervals, which act disturbingly on the embodiment of the flowmeter. An alternative solution is provided by DE102012106926A1. In such case, measuring electrode signals are brought by a compensation voltage into the working range of a circuit interpreting the signals, wherein the compensation voltage is selected from a small number of predetermined, discrete, voltage values. This procedure functions, however, only when it is assured that the disturbance voltage fluctuations take place only in a relatively limited voltage range. Moreover, the teaching is oriented toward cases, in which time periods of disturbance voltage changes are large in comparison with measurement intervals of voltage measurements.

SUMMARY

An object of the invention is, consequently, to provide a method for operating a magnetoinductive flowmeter as well as such a flowmeter, wherein a more effective flow measurement and a better and more comprehensive disturbance effect compensation are enabled.

In the case of a method of the invention for measuring flow velocity or volume flow of a medium in a measuring tube,
the medium is supplied during a supply phase with a magnetic field of a first polarity by means of at least one coil system of a magnet system, which magnetic field extends essentially perpendicularly to a measuring tube axis, wherein the magnetic field is brought about by applying an electrical coil voltage to the coil system, wherein the supply phase includes a measurement phase having an essentially constant magnetic field;
wherein a flow dependent electrode voltage induced in the medium by the magnetic field is registered by at least two measuring electrodes and output by an output unit;
wherein a magnetic field of a following, especially adjoining, supply phase has a second polarity reversed relative to the first polarity;
wherein the electrode voltage is fed to an amplifier unit, wherein a resulting amplified electrode voltage is fed to a first analog/digital converter;
wherein the electrode voltage is taken into consideration during the measurement phase for ascertaining a disturbance voltage, wherein the disturbance voltage is compensated,
wherein the disturbance voltage is ascertained by means of a digital calculation circuit, and wherein the disturbance voltage is ascertained and compensated anew for each supply phase.

In an embodiment of the method, the electrode voltage of the measurement phase of a supply phase preceding or following the supply phase, especially a supply phase nearest preceding or nearest following the supply phase, is taken into consideration for ascertaining the disturbance voltage.

By combining values of multiple electrode voltages, especially of electrode voltages from supply phases with magnetic fields of different polarity, the disturbance voltage can be more exactly determined.

In an embodiment of the method, an amplification factor of the amplifier unit is adjustable, and wherein, after compensating the disturbance voltage, a value of a difference between the amplified electrode voltage of the supply phase and the amplified electrode voltage of the following supply phase is at least 10% and especially at least 20% and preferably at least 30% of an input voltage range of the first analog/digital converter.

An increase of the difference between the amplified electrode voltages above at least 10% or especially at least 20% or preferably at least 30% of the input range of the first analog/digital converter reduces quantization noise of digital voltage values output by the first analog/digital converter.

In an embodiment of the method, the compensating of the electrode voltage is performed before delivery of the electrode voltage to the amplifier unit by means of a summing unit, which has a first signal input for the electrode voltage and a second signal input for a value of the ascertained disturbance voltage.

In an embodiment of the method, the digital calculation circuit includes a low-pass filter. The low-pass filter is adapted to isolate the slowly changing disturbance voltage from the electrode voltages, which change rapidly due to magnetic field alternations upon supply phase alternation. The digital low-pass filter evaluates a number, especially an even number, of electrode voltages of sequentially following measuring phases, in order to determine a value of an instantaneous disturbance voltage. For example, the low-pass filter can be an average value filter. For example, a weighted average can be calculated, wherein a course of values of a filter kernel of the low pass filter follow the curve of a function, or distribution, wherein the function, or distribution, is, for example, one from the following list: Gauss function, binomial distribution. The technical procedure for the filtering corresponds, in such case, to a convolution of a series of electrode voltages with the filter kernel of the utilized filter function.

In an embodiment of the method, the electrode voltages of at least four and especially at least six and preferably at least eight supply phases are taken into consideration for ascertaining the disturbance voltage.

In an embodiment of the method, the electrode voltages of at most twenty and especially at most sixteen and preferably at most twelve supply phases are taken into consideration for ascertaining the disturbance voltage.

In an embodiment of the method, the number of electrode voltages considered for ascertaining the disturbance voltage is adaptable. Especially, in the case of a fast change of the disturbance voltage, a lessening of the number can be advantageous, in order to assure a faster selecting of a proper compensating of the disturbance voltage.

In an embodiment of the method, the calculation circuit is fed the electrode voltage digitized by the first analog/digital converter.

In an embodiment of the method, the calculation circuit is fed the electrode voltage output by the output unit and digitized by a second analog/digital converter.

In an embodiment of the method, an output signal of the calculation circuit representing the disturbance voltage is fed to a digital/analog converter, which is connected with the second signal input of the summing unit.

A magnetoinductive flowmeter of the invention for implementing an above described method of the invention includes:

A measuring tube;

a magnet system having at least one coil system for producing a magnetic field in the measuring tube, wherein the magnetic field extends essentially perpendicularly to a measuring tube axis;

at least one pair of measuring electrodes for registering a flow dependent electrode voltage induced by the magnetic field;

an electronic measuring/operating circuit, which is adapted to operate the magnet system and to evaluate the electrode voltage, wherein the electronic measuring/operating circuit has a digital calculation circuit adapted to ascertain a disturbance voltage, wherein the measuring/operating circuit is adapted to compensate the disturbance voltage.

In an embodiment of the flowmeter, the measuring/operating circuit includes an amplifier as well as a first analog/digital converter, wherein the amplifier is adapted to amplify the electrode voltage and to supply the amplified electrode voltage to the first analog/digital converter, and wherein the first analog/digital converter is adapted to digitize the electrode voltage and to supply the digitized electrode voltage to the digital calculation circuit as well as to a measurement data processor.

In an embodiment of the flowmeter, the measuring/operating circuit includes an amplifier unit as well as a first analog/digital converter, as well as a second analog/digital converter, wherein the amplifier unit is adapted to amplify the electrode voltage and to supply the amplified electrode voltage to the first analog/digital converter, and wherein the first analog/digital converter is adapted to and to supply the digitized electrode voltage to a measurement data processor, wherein the second analog/digital converter is adapted to digitize the electrode voltage output by the output unit and to supply the digitized electrode voltage to the digital calculation circuit.

In an embodiment of the flowmeter, the calculation circuit includes a low-pass filter.

In an embodiment of the flowmeter, the measuring/operating circuit includes a summing unit having a first signal input for the electrode voltage and a second signal input for a value of the ascertained disturbance voltage for compensating the disturbance voltage, wherein an output of the summing unit is connected with an input of the amplifier.

In an embodiment of the flowmeter, a digital/analog converter is arranged between summing unit and calculation circuit.

In an embodiment of the flowmeter, the measuring/operating circuit includes a superordinated unit adapted to control the amplification of the electrode voltage by the amplifier unit as well as the attenuation of the disturbance voltage by the attenuator, wherein the superordinated unit is adapted, furthermore, to transmit the amplification factor to the digital calculation circuit as well as to the measurement data processor.

BRIEF DESCRIPTION OF THE DRAWING

The invention will now be described based on examples of embodiments illustrated in the appended drawing, the figures of which show as follows.

DETAILED DESCRIPTION

Figure 1:
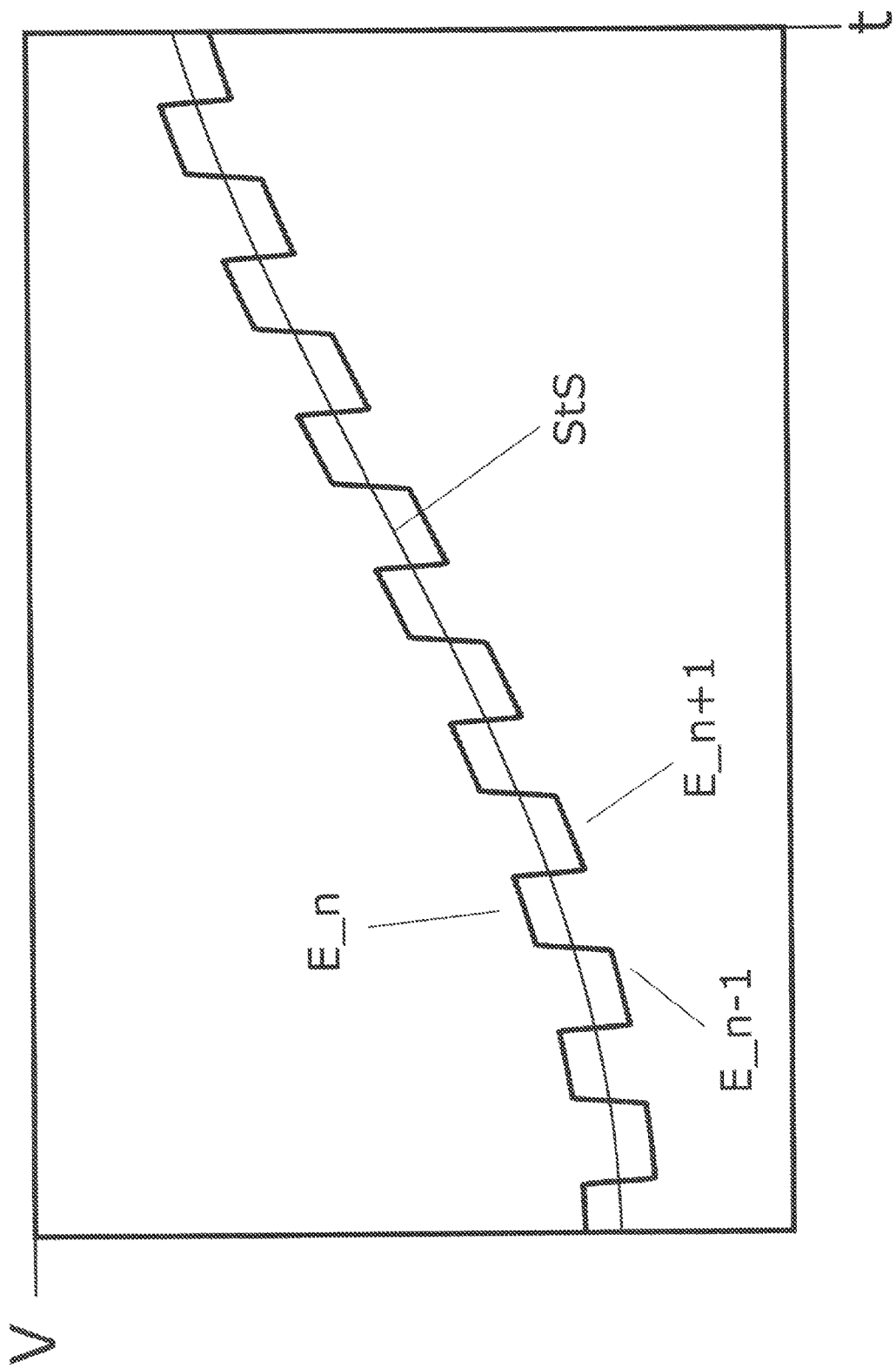
FIG. 1 shows a schematic example of electrode voltage as a function of time.

FIG. 1 shows an enlarged section of an example of an electrode voltage registered by two measuring electrodes of a magnetoinductive flowmeter. A magnetoinductive flowmeter includes usually a measuring tube, a magnet system having at least one coil system for producing a magnetic field in the measuring tube, which magnetic field is essentially perpendicular to a measuring tube axis; at least one pair of measuring electrodes for registering the flow dependent electrode voltage induced by the magnetic field; and an electronic measuring/operating circuit, which is adapted to operate the magnet system and to evaluate the electrode voltage, in order to win flow measured values from the evaluation of the electrode voltage. Usually the produced magnetic field reverses its polarity with supply phase alternation.

The curve of the electrode voltage of individual supply phases shown in FIG. 1 is greatly simplified and does not show that a supply phase includes an overvoltage phase and a measurement phase, wherein in the overvoltage phase an overvoltage is placed on the coil system, in order to settle faster into a desired state having an essentially constant magnetic field, which desired state is required for the measurement phase. The electrode voltage changes its value upon the changing between supply phases, in case the magnetic field in a following supply phase has another value or other polarity, wherein three example electrode voltages of sequentially following supply phases are designated $E\_n-1$, $E\_n$ and $E\_n+1$. The calculating of flow measured values is based on the evaluation of the difference between the measured electrode voltages of two, especially sequentially following, supply phases.

In an ideal case, in which the electrode voltage depends exclusively on the magnetic field and the flow, the sequentially measured electrode voltages would lie on either side of a zero-point. In a real situation, however, disturbance effects occur, which can be brought about, for example, by electrochemical effects at the interfaces. These disturbance effects introduce a disturbance voltage DV, which can be two to five orders of magnitude greater than a voltage difference between the electrode voltages between a supply phase and a following supply phase. For example, magnitudes of the voltage difference can lie in a first range from 0 mV to a few mV and magnitudes of the disturbance voltage can lie in a second range from 0 mV to several 100 mV. The disturbance voltage can fluctuate over the total second range in a time period, which is large compared with the duration of an individual supply phase. Typically, a supply phase takes a few milliseconds to a second. The disturbance effects are, due to the magnitude-wise potentially significantly greater voltage values in comparison with the voltage differences, problematic for flow measurement. Usually in the case of a magnetoinductive flowmeter, the electrode voltage is sent to a first analog/digital converter, in order to enable a digital signal processing. Analog/digital converters have on the input side an input voltage range, which is converted on the output side to a certain number of discrete voltage values. The analog electrode voltages are, thus, represented by digital voltage values. For flow measurement, a voltage difference between electrode voltages of measuring phases of sequentially following supply phases is taken into consideration. An analog/digital converter, on whose input voltage range a complete range of possible electrode voltages is placed, has a poor resolution for small voltage differences. This leads to a disturbing quantization noise in the registering of voltage differences.

Figure 2:
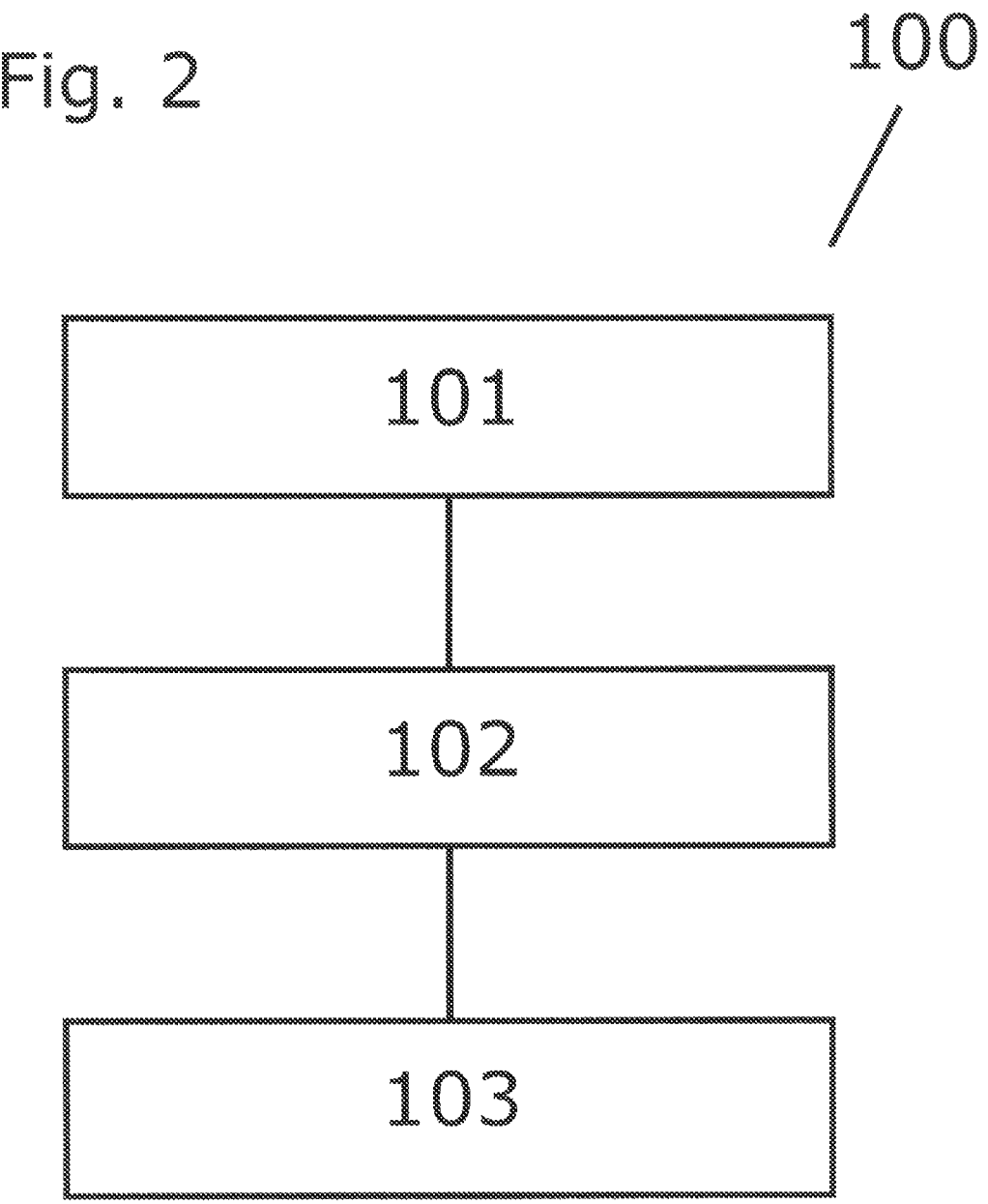
FIG. 2 shows a schematic flow diagram of a method of the present disclosure for operating a flowmeter of the present disclosure.

FIG. 2 shows a method 100, in the case of which quantization noise is reduced, wherein, in a first method step 101, a value of a disturbance voltage DV caused by disturbance effects is ascertained, wherein, in a second method step 102, the disturbance voltage is compensated, and wherein, in a third method step 103, the voltage difference between electrode voltages of sequentially following measuring phases is adapted to the input voltage range of the first analog/digital converter. The ascertaining of the disturbance voltage is performed via a digital calculation circuit, which includes a digital, low-pass filter. The digital, low-pass filter evaluates a number, especially an even number, of electrode voltages of sequentially following measuring phases, in order to determine an instantaneous value of a disturbance voltage. The low-pass filter can be an average value filter, for example. For example, a weighted average can be calculated, wherein a course of values of a filter kernel of the low pass filter follow the course of a function, or distribution, wherein the function, or distribution, is one from the following list: Gauss function, binomial distribution. The distribution can also be determined via a numerical filter design method.

After determining the disturbance voltage, the disturbance voltage, or the fraction of the disturbance voltage imposed on the electrode voltage, is compensated, so that the electrode voltage, after amplification with an amplifier unit, is fed to an input of the first analog/digital converter. The compensation occurs, thus, by means of a feedback of the disturbance imposed on the electrode voltage.

Figure 3:
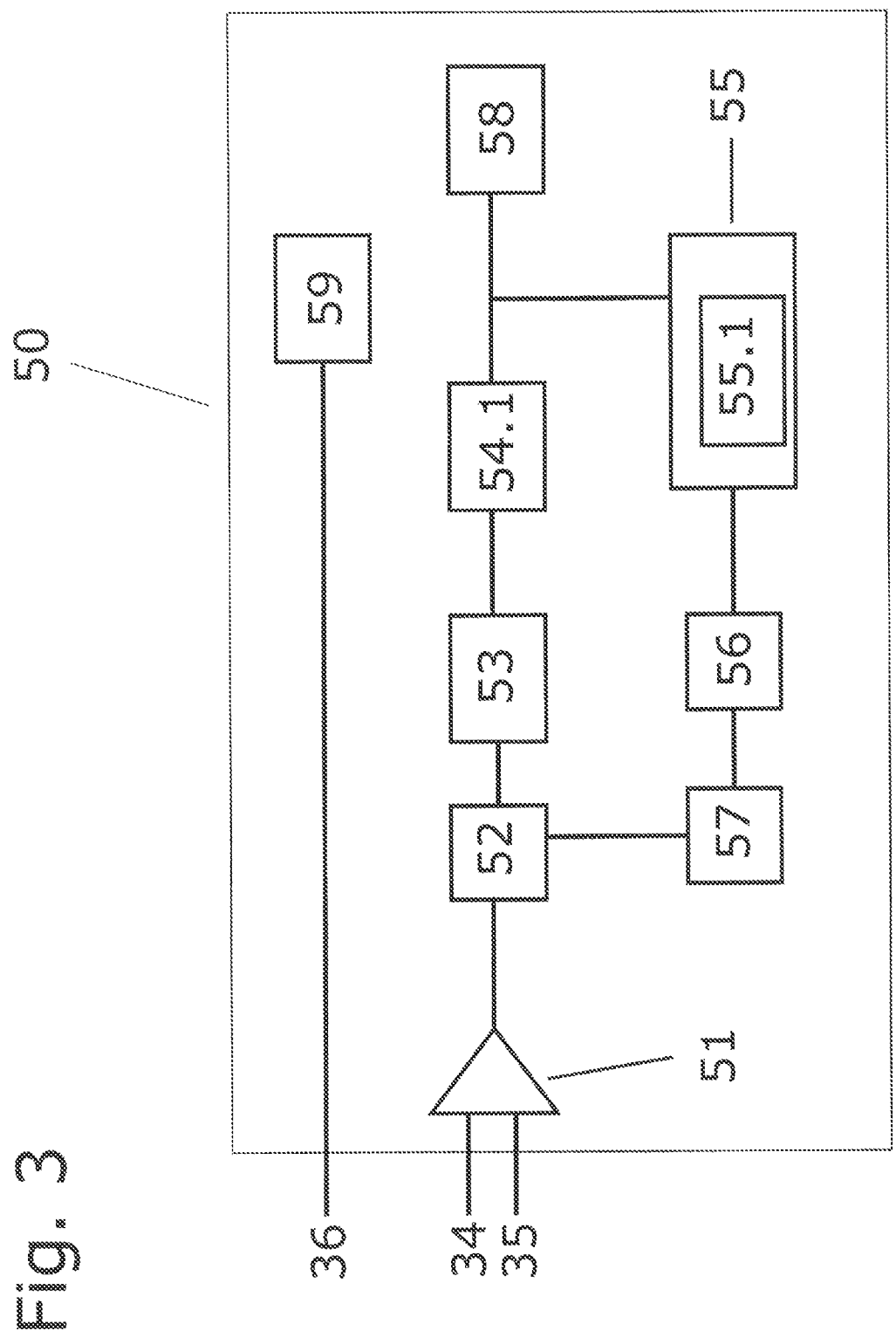
FIG. 3 shows by way of example, a schematic embodiment of an electronic measuring/operating circuit of a flowmeter of the present disclosure.

FIG. 3 shows, by way of example, an embodiment of the measuring/operating electronics 50, which includes an output unit 51 for registering and outputting the electrode voltage, an adding/subtracting unit 52, an amplifier unit 53, a first analog/digital converter 54.1, a digital calculation circuit 55 having a digital low-pass filter 55.1, a digital/analog converter 56, an attenuator 57, a measurement data processor 58 and a superordinated unit 59. The output unit 51 registers via lines 34 and 35 the electrical potentials of the measuring electrodes 31, 32 shown in FIG. 5 and outputs the potential difference as an electrode voltage, to which a disturbance signal is added, or subtracted, as the case may be. The amplifier unit 53 is adapted so to amplify the modified electrode voltage output from the adding/subtracting unit 52 that a value of a difference between the amplified electrode voltage of the supply phase and the amplified electrode voltage of the following supply phase is at least 10% and especially at least 20% and preferably at least 30% of the input voltage range of the first analog/digital converter. A selected amplification factor remains, in such case, constant over at least one supply phase. The first analog/digital converter 54.1 converts the analog electrode voltage into a digital voltage value, which is fed to the measurement data processor 58 as well as to the digital calculation circuit 55. In an alternative embodiment, the digital calculation circuit 55 can also be part of the measurement data processor 58. After ascertaining a value of the disturbance voltage by means of the digital low pass filter 55.1, the digital value of the disturbance voltage is converted by means of a digital/analog converter 56 into an analog voltage and attenuated by the attenuator 57 with an attenuation factor inverse to the amplification factor. The attenuated disturbance voltage is fed to the adding/subtracting unit 52, which corrects the electrode signal supplied from the output unit 51 by the attenuated disturbance voltage. In the case of change of the flow, it can be necessary to change the amplification factor of the amplifier unit, in order to assure that the value of the difference between the amplified electrode voltage of the supply phase and the amplified electrode voltage of the following supply phase, on the one hand, remain within the input voltage range of the first analog/digital converter and, on the other hand, are at least 10% and especially at least 20% and preferably at least 30% of the input voltage range. The superordinated unit 59 controls the amplification factor of the amplifier unit 53 and transmits the amplification factor to the measurement data processor 58, the digital calculation circuit 55 and the attenuator 57, in order that they interpret the obtained digital voltage values correctly. In order to avoid a confusing diagram, electronic connections between the superordinated units 59 and its connected elements are not shown in FIG. 3. The measurement data processor ascertains an instantaneous measured value of flow based on a voltage difference between the electrode voltages of two measuring phases, so that a current amplification factor must be known for interpreting the corresponding digital voltage values. The measurement data processor 58 can include a bandpass filter, in order at least partially to compensate remaining disturbance voltage fractions not compensated via the digital calculation circuit. In equal manner, also the digital calculation circuit 55 takes into consideration the amplification factor belonging to the entering digital voltage value for calculating the disturbance voltage. For calculating the disturbance voltage via the digital low-pass filter, a certain number of digital voltage values are used. The corresponding amplification factors are taken into consideration. In an embodiment, the number of digital voltage values used is adaptable, in order, for example, in the case of a fast disturbance voltage change to achieve a better reaction time for the disturbance voltage compensation by lessening the number voltage values used. The superordinated unit 59 is adapted, furthermore, to operate the magnet system.

Figure 4:
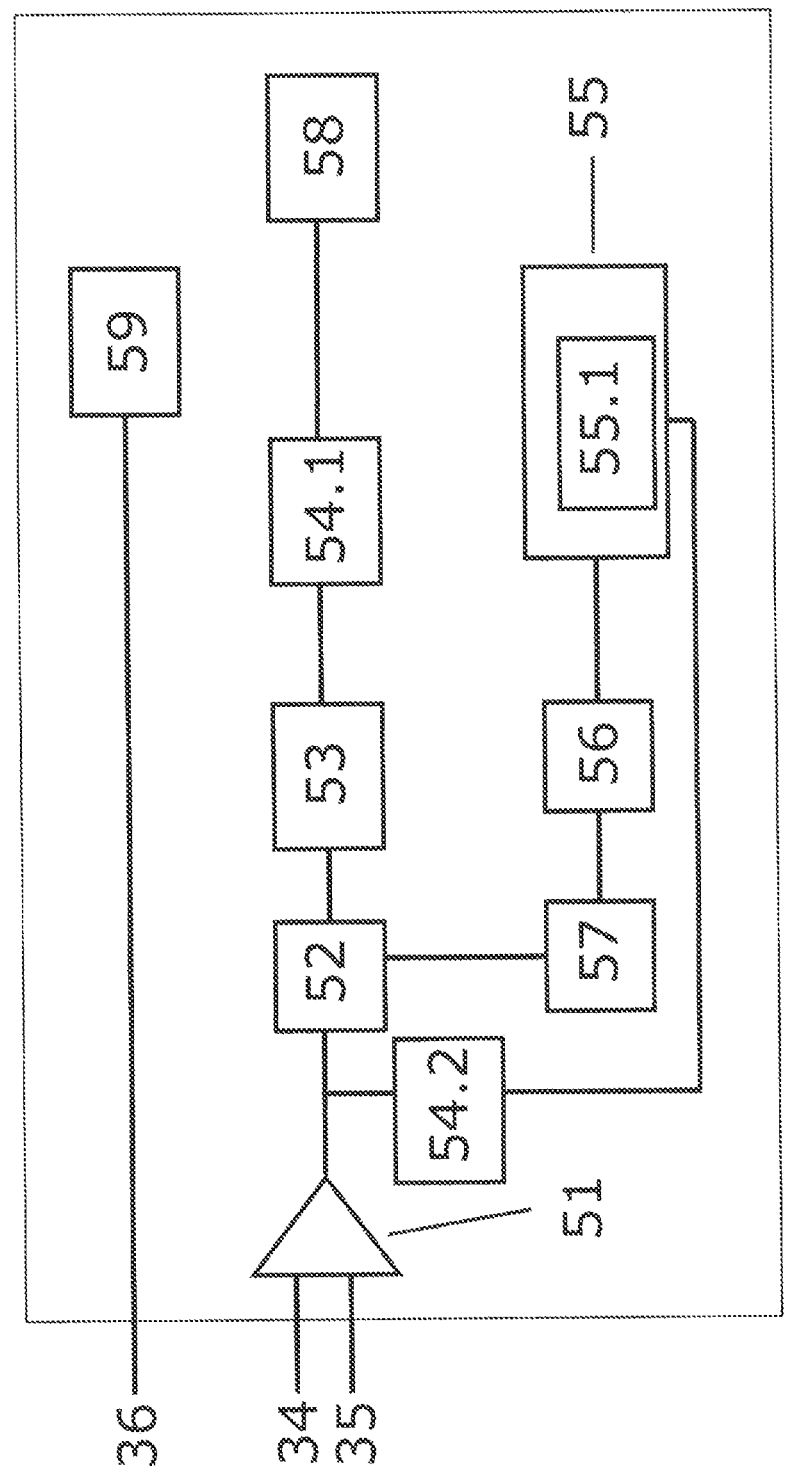
FIG. 4 shows an alternative embodiment of the measuring/operating electronics.

FIG. 4 shows an alternative embodiment of the measuring/operating electronics 50, wherein the measuring/operating circuit, in contrast with the embodiment of FIG. 3, has a second analog/digital converter 54.2, wherein the calculation circuit 55 is fed the electrode voltage output by the output unit 51 and digitized by the second analog/digital converter 54.2.

Figure 5:
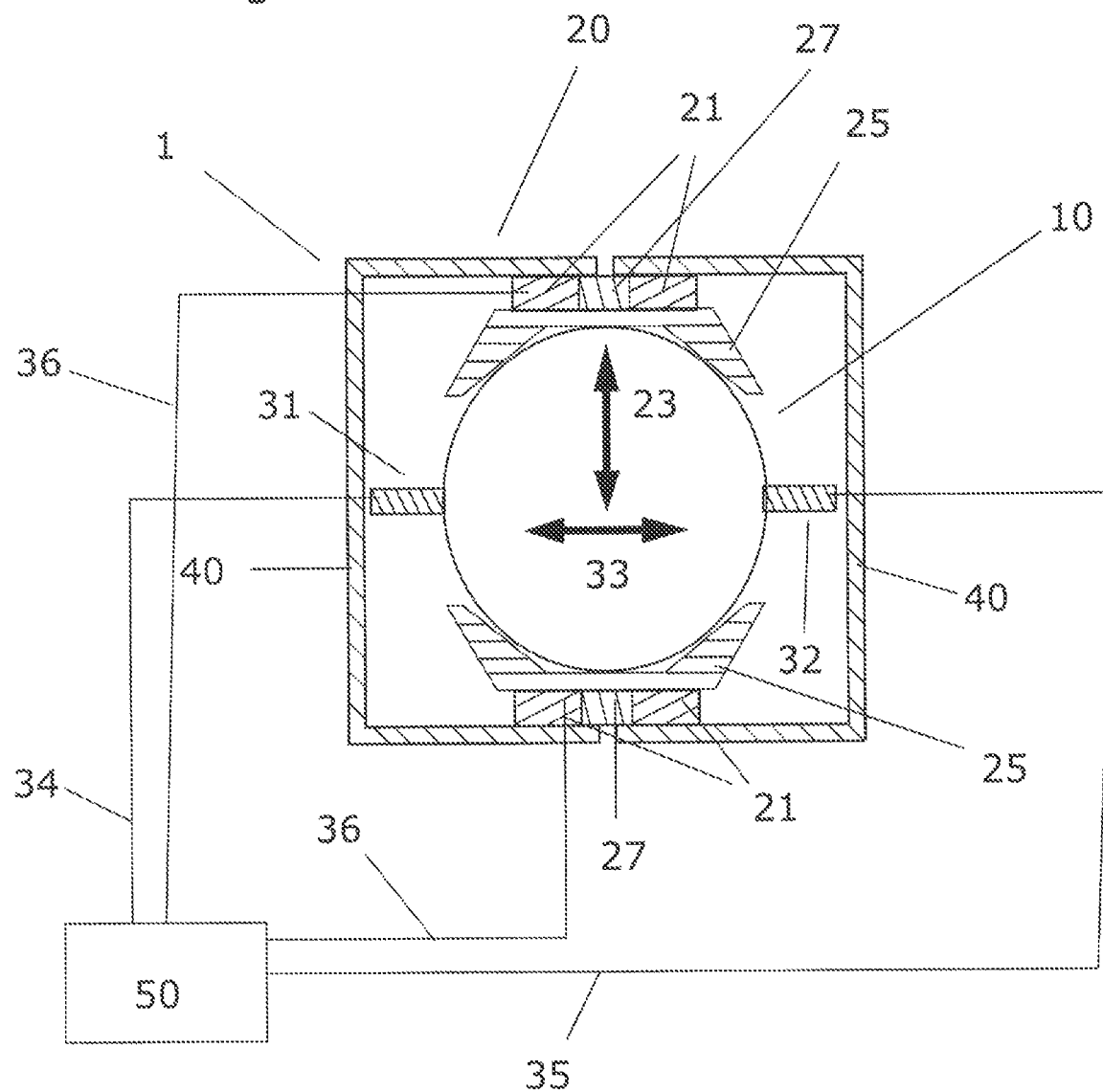
FIG. 5 shows an example of a cross section of a magnetoinductive flowmeter of the present disclosure.

FIG. 5 shows an example of a cross section of a magnetoinductive flowmeter 1 of the invention, including a measuring tube 10; a magnet system 20 with coil systems 21 including, in each case, a coil core 27 and a pole shoe 25; as well as measuring electrodes 31 and 32 for registering a voltage induced in the medium. The magnet system supplies the medium in the measuring tube 10 with a magnetic field, which extends in the direction of the arrow 23. The magnetic field as well as the flow of the medium through the measuring tube lead to an electrode voltage in the direction of the arrow 33. The magnetoinductive flowmeter can, furthermore, include a field guide-back 40. The measuring electrodes 31, 32 as well as the coil systems 21 are connected via lines 34, 35, 36 with the measuring/operating circuit 50, which is adapted to operate the magnet system as well as the measurement electrodes. The pole shoes 25 are adapted to assure an as uniform as possible distribution of the magnetic field across the measuring tube cross section.

The invention claimed is:

1. A method for operating a magnetoinductive flowmeter for measuring flow velocity or volume flow of a medium in a measuring tube, including:
   supplying the medium during a supply phase with a magnetic field of a first polarity by means of at least one coil system of a magnet system, which magnetic field extends perpendicularly to a measuring tube axis, wherein the magnetic field is generated by applying an electrical coil voltage to the coil system, wherein the supply phase includes a measurement phase having an essentially constant magnetic field;
   wherein a flow dependent electrode voltage induced in the medium by the magnetic field is registered by at least two measuring electrodes and output by an output unit;
   wherein a magnetic field of a following supply phase has a second polarity reversed relative to the first polarity;
   wherein the electrode voltage is fed to an amplifier unit, wherein a resulting amplified electrode voltage is fed to a first analog/digital converter;
   ascertaining a disturbance voltage based at least in part on the electrode voltage during the measurement phase; and
   ascertaining the disturbance voltage using a digital calculation circuit, wherein the disturbance voltage is ascertained and compensated anew for each supply phase;
   wherein the digital calculation circuit includes a low-pass filter;
   where the low pass filter evaluates a number of electrode voltages of sequentially following measuring phases.

2. The method of claim 1, wherein the electrode voltage of the measurement phase of the supply phase preceding or following the supply phase is taken into consideration for ascertaining the disturbance voltage.

3. The method of claim 1, wherein an amplification factor of the amplifier unit is adjustable, and wherein, after compensating the disturbance voltage, a value of a difference between the amplified electrode voltage of the supply phase and the amplified electrode voltage of the following supply phase is at least 10% of an input voltage range of the first analog/digital converter.

4. The method of claim 1, wherein compensation of the electrode voltage is performed before delivery of the electrode voltage to the amplifier unit using an adding/subtracting unit, which includes a first signal input for the electrode voltage and a second signal input for a value of the ascertained disturbance voltage.

5. The method of claim 4, wherein an output signal of the digital calculation circuit representing the disturbance voltage is fed to a digital/analog converter, which is connected with the second signal input of the adding/subtracting unit.

6. The method of claim 1, wherein the electrode voltages of at least four supply phases are taken into consideration for ascertaining the disturbance voltage.

7. The method of claim 1, wherein the electrode voltages of at most twenty supply phases are taken into consideration for ascertaining the disturbance voltage.

8. The method of claim 1, wherein the number of electrode voltages considered for ascertaining the disturbance voltage is adaptable.

9. The method of claim 1, wherein the calculation circuit is fed the electrode voltage digitized by the first analog/digital converter.

10. The method of claim 1, wherein the calculation circuit is fed the electrode voltage output by the output unit and digitized by a second analog/digital converter.

11. A magneto inductive flowmeter, including:
   a measuring tube;
   a magnet system having at least one coil system for producing a magnetic field in the measuring tube, wherein the magnetic field extends essentially perpendicularly to a measuring tube axis;
   at least two measuring electrodes for registering a flow dependent electrode voltage induced by the magnetic field;
   an output unit for registering and outputting the electrode voltage registered by the measurement electrodes; and
   an electronic measuring/operating circuit, which is adapted to operate the magnet system and to evaluate the electrode voltage for determining flow measured values;
   wherein the electronic measuring/operating circuit has a digital calculation circuit adapted to ascertain a disturbance voltage, and the measuring/operating circuit is adapted to compensate the disturbance voltage;

wherein the digital calculation circuit includes a low-pass filter;

where the low pass filter evaluates a number of electrode voltages of sequentially following measuring phases.

12. The magneto inductive flowmeter of claim 11, wherein the measuring/operating circuit includes an amplifier unit as well as a first analog/digital converter, wherein the amplifier unit is adapted to amplify the electrode voltage and to supply the amplified electrode voltage to the first analog/digital converter, and wherein the first analog/digital converter is adapted to digitize the electrode voltage and to supply the digitized electrode voltage to the digital calculation circuit as well as to a measurement data processor.

13. The magneto inductive flowmeter of claim 12, wherein the measuring/operating circuit includes an adding/subtracting unit having a first signal input for the electrode voltage and a second signal input for a value of the ascertained disturbance voltage for compensating the disturbance voltage, wherein an output of the adding/subtracting unit is connected with an input of the amplifier unit.

14. The magneto inductive flowmeter of claim 11, wherein the measuring/operating circuit includes an amplifier unit as well as a first analog/digital converter, as well as a second analog/digital converter, wherein the amplifier unit is adapted to amplify the electrode voltage and to supply the amplified electrode voltage to the first analog/digital converter, and wherein the first analog/digital converter is adapted to digitize the electrode voltage and to supply the digitized electrode voltage to a measurement data processor, wherein the second analog/digital converter is adapted to digitize the electrode voltage output by the output unit and to supply the digitized electrode voltage to the digital calculation circuit.

15. The magneto inductive flowmeter of claim 11, wherein the digital calculation circuit includes a low-pass filter.

16. The magneto inductive flowmeter of claim 15, wherein the measuring/operating circuit further includes a digital/analog converter arranged between adding/subtracting unit and calculation circuit.

17. The magneto inductive flowmeter of claim 11, wherein the measuring/operating circuit includes a superordinated unit adapted to control the amplification of the electrode voltage by the amplifier unit and the attenuation of the disturbance voltage by the attenuator, wherein the superordinated unit is adapted, furthermore, to transmit the amplification factor to the digital calculation circuit and to the measurement data processor.

* * * * *